US006942336B2

(12) United States Patent
Foulke et al.

(10) Patent No.: US 6,942,336 B2
(45) Date of Patent: Sep. 13, 2005

(54) TRAINING AID USING VISION RESTRICTION AND METHOD OF USE

(75) Inventors: David S. Foulke, Spring House, PA (US); Vincent J. Russomagno, Centerville, DE (US)

(73) Assignees: Penllyn Limited Partnership, Spring House, PA (US); St. Moritz Limited Partnership, Centerville, DE (US)

( * ) Notice: Subject to any disclaimer, the term of this patent is extended or adjusted under 35 U.S.C. 154(b) by 0 days.

(21) Appl. No.: 10/747,845

(22) Filed: Dec. 29, 2003

(65) Prior Publication Data

US 2005/0146674 A1    Jul. 7, 2005

(51) Int. Cl.[7] .............................................. G02C 7/16
(52) U.S. Cl. ........................................ 351/46; 351/45
(58) Field of Search ........................... 351/45, 46, 47, 351/48, 57, 58, 41, 158, 53

(56) References Cited

U.S. PATENT DOCUMENTS

| | | |
|---|---|---|
| 5,177,510 A | 1/1993 | Peters et al. |
| 5,489,953 A | 2/1996 | Griffith |
| 5,521,653 A | 5/1996 | Anderson |
| 5,561,480 A | 10/1996 | Capes |
| 5,675,398 A | 10/1997 | Moore |
| 5,963,294 A | 10/1999 | Schiffer |
| 6,003,990 A * | 12/1999 | Einhorn ................ 351/45 |
| 6,145,983 A | 11/2000 | Schiffer |
| 6,352,345 B1 | 3/2002 | Zolten |
| 6,513,928 B1 | 2/2003 | Moore |
| 6,595,636 B2 | 7/2003 | Zolten |

OTHER PUBLICATIONS

Part of package of Dribble Master basketball training goggles, date unknown.

* cited by examiner

Primary Examiner—Hung Xuan Dang
(74) Attorney, Agent, or Firm—Howson and Howson

(57) ABSTRACT

Opaque films adhering electrostatically to lenses of eyewear, are used to train baseball fielders and golfers. For baseball, films placed on the lower parts of the lenses encourage the player to follow a ball visually throughout its entire path of travel toward the player's glove. For golf an opaque film covers one lens, and an opaque film having a lenticular transparent opening in its upper part is placed on the other lens. The films encourage the golfer to keep the head down and behind the ball during the downswing.

7 Claims, 3 Drawing Sheets

TRAINING AID USING VISION RESTRICTION AND METHOD OF USE

FIELD OF THE INVENTION

This invention relates to improvements in training for sports, and particular to vision-restricting eyewear for training of individuals in fielding baseballs, and in swinging a golf club.

BACKGROUND OF THE INVENTION

One of the problems commonly encountered in training a baseball player, especially a young, inexperienced player, is that, when fielding line drives and ground balls, he or she has a tendency to watch the batter while tracking the ball in the lower part of the visual field. As the ball approaches the glove, the fielder loses sight of the ball, and will frequently be unable to catch it. On occasion, the ball will strike an unprotected part of the fielder's body, causing injury.

Losing sight of the ball is a major cause of fielding errors by young players, and has been difficult to correct, even with intensive coaching. The problem is experienced not only by infielders and pitchers in fielding ground balls and line drives, but also by outfielders attempting to retrieve ground balls, by first basemen and other infielders attempting to catch low throws, and by catchers when attempting to catch a low pitch or a throw from another player made while a runner is approaching from third base.

For amateur golfers, one of the two most common causes of poor hitting is looking up before the swing is finished. Another cause of poor hitting is moving the head forward of the ball. Golf professionals teach that a player's head must stay "behind the ball". That is, the player's head must face a location behind the ball at the time of impact. By observing these rules consistently, professional golfers avoid fading and slicing.

Keeping one's eyes on the ball is important, but by itself it does not solve the problem of fading and slicing. Since the eyes are not stationary in the head, it is possible to focus on the ball while rotating the head forward of the ball in the direction of the target during the downswing. The inevitable result is a slice or a fade.

The player will not necessarily be aware of a forward head movement. Often, the only way the player will know that his or her head moved forward is by observing the shot go to the right or left, or by being told of the head movement by a careful observer.

BRIEF SUMMARY OF THE INVENTION

A general object of this invention is to provide a simple, convenient, easily used, and effective device for training baseball players or golfers. In baseball, the invention trains players to keep their eyes on the ball at the critical time. In golf, the invention trains golfers both to keep their heads down and also to keep their heads behind the ball during the downswing. Another object of the invention is to provide more effective training methods both in baseball and in golf.

The training aid in accordance with the invention preferably comprises an eyeglass frame having a pair of transparent lenses, each lens having an upper and lower region, and an opaque layer of film adhering to each of the transparent lenses and covering at least part of the lower region of at least one of the lenses while leaving at least a portion of the upper region thereof uncovered and transparent.

For baseball fielding, the opaque layer of film on each lens covers at least part of the lower region thereof while leaving the upper region thereof uncovered and transparent.

The opaque layers are peelable from the lenses and adhere to the lenses by electrostatic attraction. The lower edge of each film layer conforms in shape to, and coincides with, the lower edge of the lens to which it adheres.

Each film layer has an upper edge extending across substantially the entire width thereof. In the case of a training aid for baseball fielders, the upper edge is convex upwardly, so that the film layers obscure a portion of the central part of the visual field that is vertically higher than the obscured portions of the left and right portions of the visual field. In the baseball fielding training aid, a plurality of pairs of opaque layers of film are supported on a backing layer and peelable therefrom. In each of the opaque film the radii of curvature of all portions of the downwardly convex lower edge are greater than the radii of curvature of all portions of the upwardly convex upper edge thereof.

Preferably, the pairs of opaque film layers on the backing layer are provided in different sizes. Thus, the height and width of each of the opaque film layers of one of the pairs are greater respectively than the height and width of each of the opaque film layers of another of the pairs.

The plurality of pairs of opaque layers are preferably provided in a kit in combination with an eyeglass frame having a pair of transparent lenses and the lower edges of the opaque layers of film of each pair conform in shape respectively to the lower edges of the transparent lenses.

In training an individual in fielding, baseballs are repeatedly projected at, and caught by, the individual in a glove while the central part of the lower portion of the individual's field of vision is obscured. As a result, the individual is trained to follow each baseball visually along the entire path of travel of the baseball to the glove.

Preferably, parts of the individual's field of vision to the right and left of the central part of the lower portion of the individual's field of vision are also obscured, but the heights of the obscured right and left parts of the individual's field of vision are less than the height of the obscured central part of the individual's field of vision. After baseballs are repeatedly projected at, and caught by, the individual while the central part of the lower portion of the individual's field of vision is obscured, the height and/or width of the obscured central part of the individual's field of vision may be reduced, and further baseballs may then be repeatedly projected at, and caught by, the individual while the obscured central part of the individual's field of vision is obscured to a reduced height and/or width. The height and width of the obscured part of the field of vision can be reduced by reducing the height of the obscured central part of the lower portion of the individual's field of vision and the obscured parts of the individual's field of vision to the right and left of the central part.

The training aid and method in accordance with the invention system have been found effective in teaching baseball players at all positions to field ground balls and line drives.

For golf, the opaque layer of film on at least one of the lenses covers substantially the entire width of the lower region, and right and left portions of the upper region thereof. Preferably for a right-handed golfer, the film covers the entire right lens, making it completely opaque, while the film on the left lens covers the lower region of the lens from right to left, and right and left portions of the upper region, the film having a lenticular-shaped, transparent, opening between the right and left portions.

The lenticular-shaped, transparent, opening requires the golfer to keep his or her head down in order to see the ball (on the ground or on a tee), and causes the ball to disappear from view upon a relatively slight head movement to the right or left, thereby also encouraging the golfer to keep his or her head behind the ball.

Other objects, details and advantages of the invention will be apparent from the following detailed description when read in conjunction with the drawings.

DETAILED DESCRIPTION OF THE PREFERRED EMBODIMENT

Figure 1:
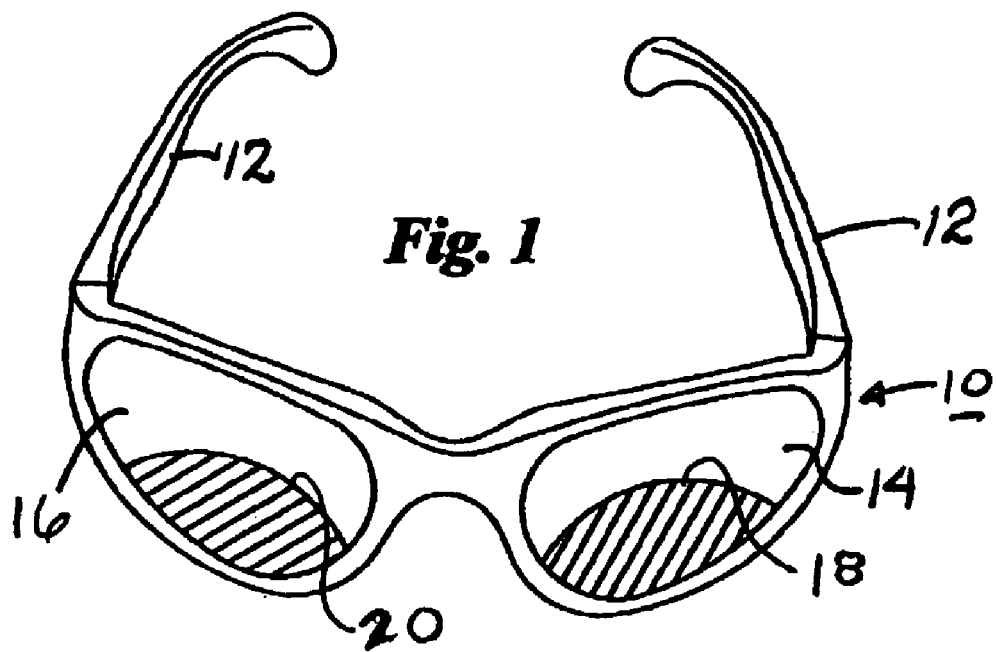
FIG. 1 is a perspective view showing the front of a pair of eyeglasses equipped with opaque film layers in accordance with the invention.
Figure 2:
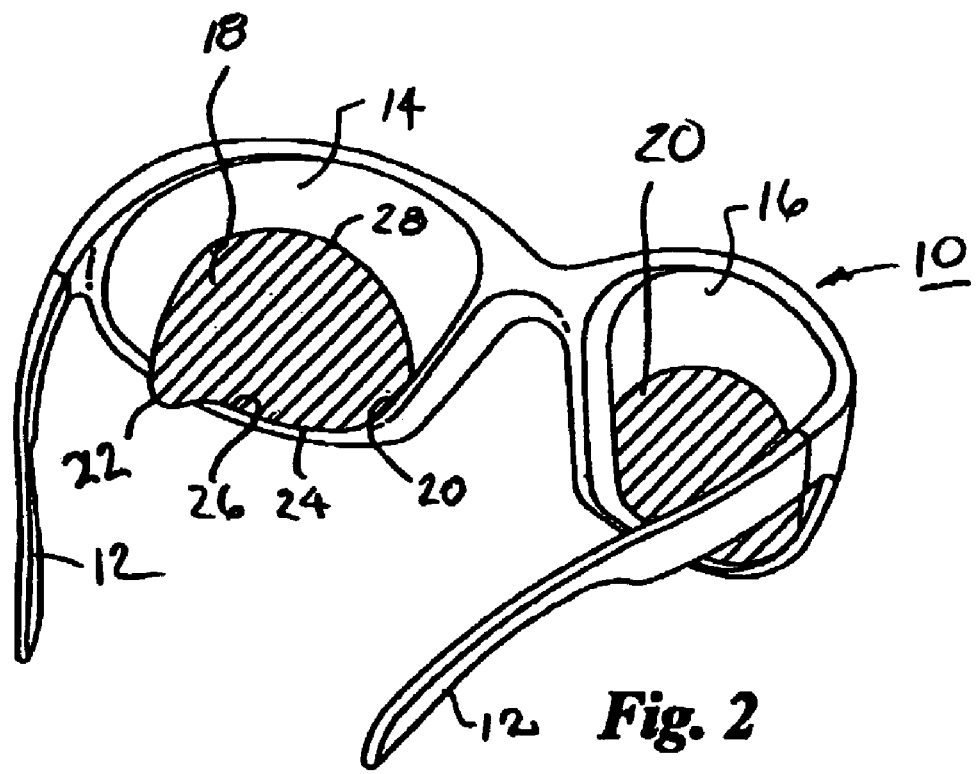
FIG. 2 is a perspective view showing the rear of the eyeglasses of FIG. 1, and showing one of the opaque film layers a partially peeled from one of the lenses.

FIGS. 1 and 2 show an eyeglass frame 10, having side members 12 which extend past the wearer's temples and over the ears. The frame has a pair of transparent lenses 12 and 14. The construction of the eyeglasses is conventional. The frames are preferably composed of a high strength resin and may be metal-reinforced. The side members may be spring-loaded, or inherently resilient in order to exert a gentle force on the sides of the wearer's head to hold the frame in place. The lenses should be hard coated, and composed of optical grade, impact and scratch-resistant polycarbonate. Preferably, the lenses are tinted and polarized, and made from a composition affording a high degree of ultraviolet protection.

Opaque film layers 18 and 20 film adhere to the lower region of the lenses 14 and 16 respectively, covering a least part of the lower region of each lens while leaving the upper region uncovered and transparent. The film layers are preferably composed of a soft polyvinylidene resin, and adhere to the inside faces of the lenses, as shown in FIG. 2, by electrostatic attraction. Thus, the film layers can be secured to the inside faces of the lenses without the use of an adhesive, and readily peeled away from the lenses.

As shown in FIG. 2, the width of layer 18 extends from its rightmost part 21 to its leftmost part 22. A lower edge 24 extends across substantially the entire width of the film layer 18, and preferably conforms in shape to, and coincides with, the lower edge 26 of lens 14. The lower edge of film layer 20 similarly coincides with and conforms to the lower edge of lens 16. Therefore, as best seen in FIG. 1, the lower edge of each film layer extends along a major part of the lower edge of the lens to which it adheres. Ordinarily, the lower edge of the lens will be downwardly convex, that is, its curvature is such that its lowermost part is located centrally, and the edge progresses upward continuously on both sides of the lowermost part. The lowermost part of the film layer has an identical, downwardly convex, curvature.

The upper edge 28 of film layer 18 has an upwardly convex curvature, and consequently the film layer obscures a vertically higher portion of the central part of the visual field than of the left and right portions of the visual field. The film layer therefore allows the player a high degree of peripheral vision while obscuring a relatively large part of the lower portion of the central visual field.

The downwardly convex lower edge 24 of film layer 18, which extends across substantially the entire width of the film layer has a more gradual curvature than that of the upwardly convex upper edge 28, which also extends across substantially the entire width of the film layer. Preferably, the radii of curvature of all portions of the lower edge 26 are greater than the radii of curvature of all portions of the upper edge 28. The corners at the rightmost and leftmost parts of the film layer have a very small radius of curvature.

Figure 3:
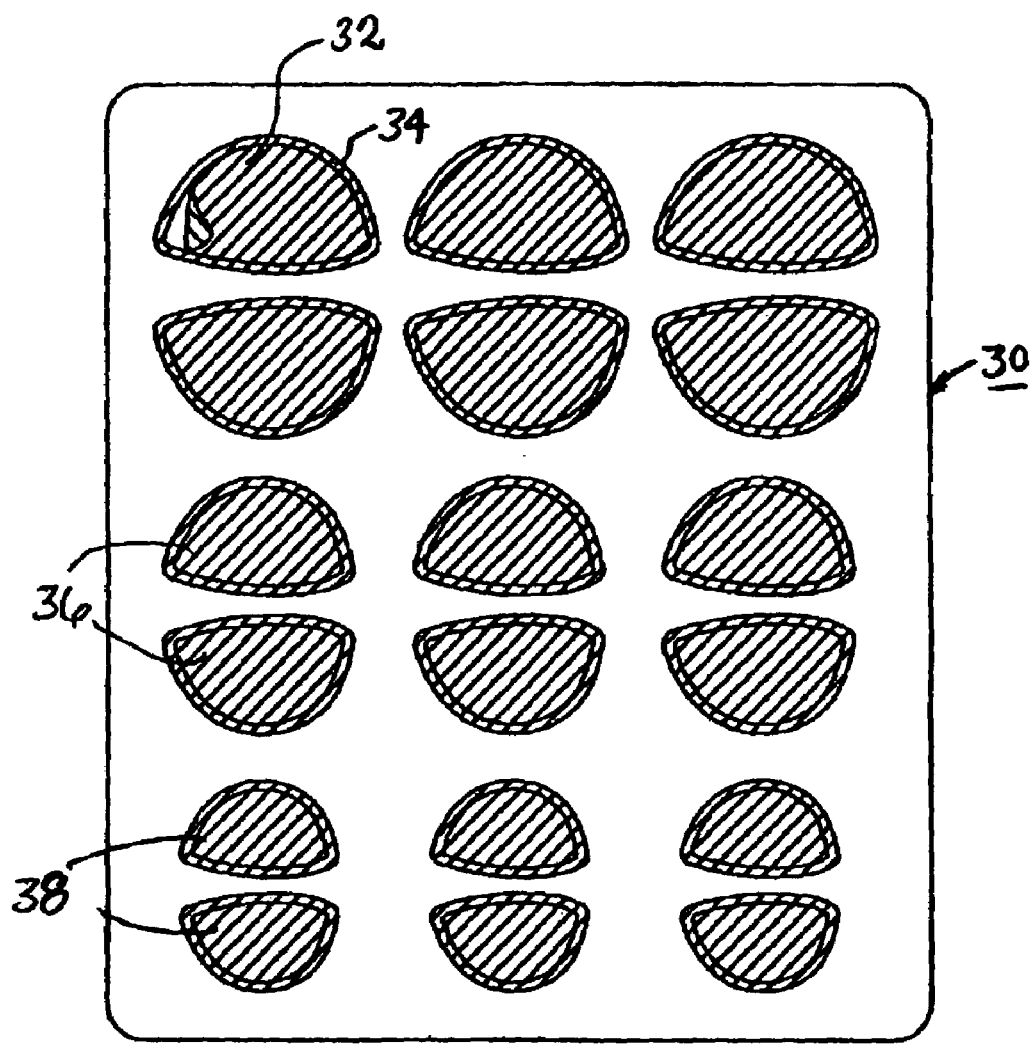
FIG. 3 is a plan view of a sheet having a backing layer and a plurality of pairs of opaque layers of film supported thereon and peelable therefrom, for use in baseball training.

The opaque film is supplied on a laminated sheet composed of a paper backing, a release layer, and a film layer. The opaque regions are printed on the film, and die cut in the appropriate size and shape. As shown in FIG. 3, a rectangular sheet 30 has nine pairs of peelable films, provided in three different sizes. One of the peelable films, 32, is shown partially peeled away from the backing. The size of each of the opaque printed regions is slightly larger than the size of the die-cut portion thereof, leaving a narrow margin 34 to allow for possible misalignment of the sheet as it moves from the printing stage to the die-cutting stage in the manufacturing process.

The player will normally begin by applying a pair of the largest films to the lenses of a pair of glasses. While wearing the glasses, the player should have another individual throw slow ground balls from a distance of about ten paces. At first, the player may lose sight of the ball as it approaches, but eventually, the player will learn to follow the ball visually all the way into the glove. This exercise should be repeated until the player is able to catch at least 90% of the ground balls consistently.

Next, slow grounders should be thrown to the player's right and left, repeating until the player is able to catch at least 90% of them consistently. Then, the throws can be mixed, some being thrown to the left, others thrown to the right, and others directly toward the player. The convex curvature of the upper edges of the films provides the player with a larger field of vision to either side of center, so that balls thrown to the right or left can be caught more easily.

As the player's confidence builds, balls can be thrown toward the player in the air, following the same patterns as described for ground balls.

Once the player is fielding slowly thrown balls consistently, the balls can be thrown at higher speed. When the player is confident that he or she is visually following the ball into the glove consistently, smaller films, e.g. films 36, can be substituted for the large films. Eventually, after some practice with the smallest films 38, the training aid will not be needed.

The training aid should not be used to field batted balls or balls projected by a throwing machine. It is unnecessary to practice with fast moving balls. In time, the player's ability to field the hard hit balls will become automatic just as in the case of slowly thrown balls.

The training aid should not be used in a game or in practice where a throw may come unexpectedly from more than one direction. In this case, the opaque films should be removed, and the player may wear the glasses as protective eyewear without the films.

The training aid can be used in a similar manner in practicing catching throws at first base, especially low throws that hit the ground before being caught. Similarly, the training aid can also be used by a catcher to practice catching or blocking errant pitches, especially low pitches that hit the ground in front of the catcher.

Figure 4:
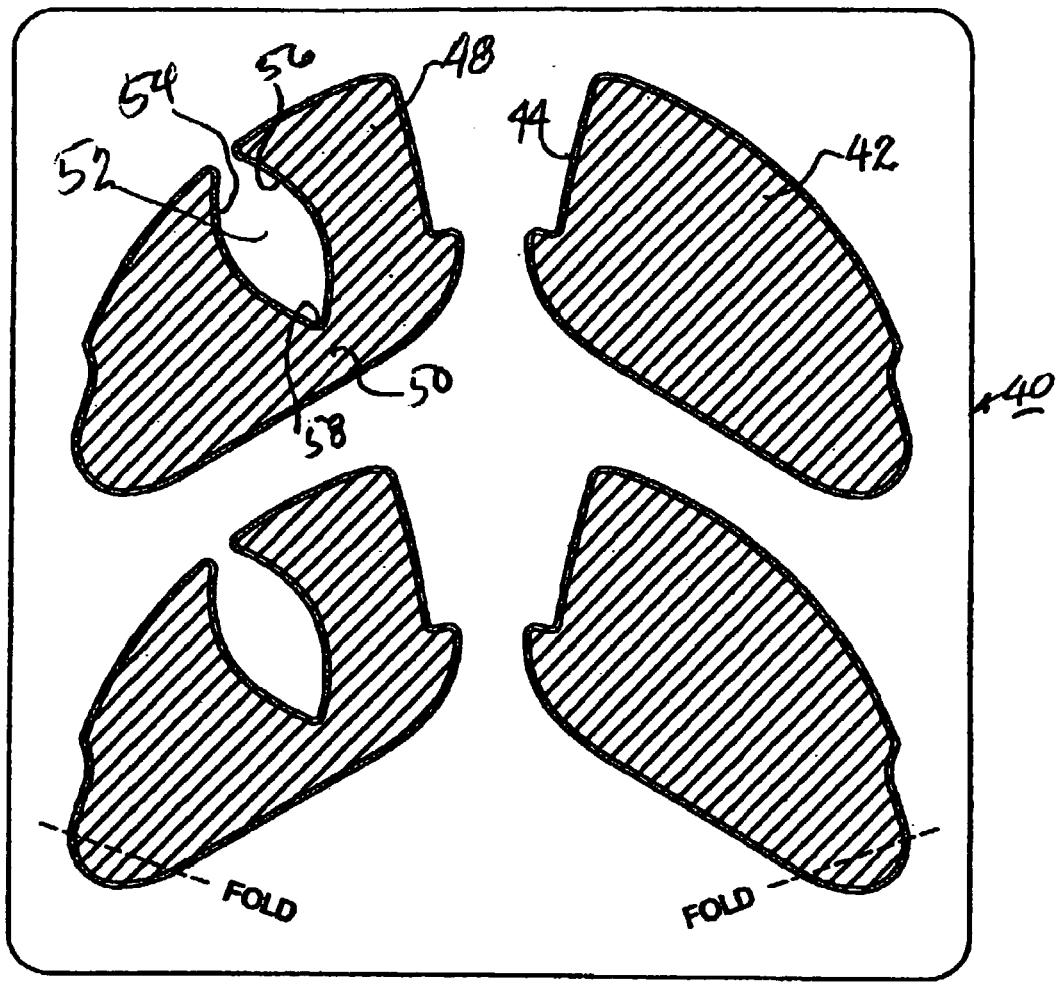
FIG. 4 is a plan view of a sheet having a backing layer and a plurality of pairs of opaque layers of film supported thereon and peelable therefrom, for use in golf training.

As shown in FIG. 4, the films for golf training are similarly provided as parts of a laminated sheet 40, comprising a paper backing, a release layer and a printed, die-cut film.

Two identical pairs of films are provided. One of the pairs consists of a first element 42, which is designed to render the entirety of one of the lenses of a pair of eyeglasses opaque. The element 42 is set back at 44 to accommodate a nosepiece (not shown) of the eyeglasses to which it is to be attached, and has a rounded projection 46 to cover a similarly configured projecting portion of the eyeglass lens. The other element 48 has an outline which is a mirror image of the outline of element 42. The outlines of the elements, of course, can differ from the specific outlines shown in order to conform to different eyeglass lens shapes.

The lower part 50 of element 48 is continuous from the right side to the left side of element 48, so that it obscures the entire lower part of the field of vision of the eye. A lenticular opening 52 is provided in the upper portion of the element 48 approximately midway between the right and left sides. The sides 54 and 56 of the lenticular opening diverge, proceeding upward from a lowermost point 58, and then converge. The border of the lenticular opening may be discontinuous at the upper end, as shown.

As shown in FIG. 4, fold lines are printed on the film to indicate to the user where the backing sheet should be bent in order to begin peeling the films away from the backing.

The manner in which the elements 42 and 48 are applied to a pair of eyeglasses depends on whether the golfer is right-handed or left-handed. A right-handed golfer, assuming he has good vision in both eyes, will apply the fully opaque film element 42 to the right-hand lens of the eyeglasses, and the film element 48, having the lenticular opening, to the left-hand lens. A left-handed golfer will do the opposite. Because the films adhere electrostatically to the lenses of the eyeglasses, either surface can be placed against an eyeglass lens.

In the case of the right-handed golfer, the lenticular opening will allow the golfer's left eye to view a ball on the ground (or on a tee). The lenticular shape of opening 52 encourages the golfer to keep his or her head down, in a position to afford maximum visibility to the left and right of the ball. If the golfer's head is moved more than a very short distance to the left or right, the ball can no longer be seen. However, the golfer can move his or her eyes to the right or left, and still see the ball, so long as the head is held steady.

Locating the film element having the opening over the forward eye (the eye closest to the target) ensures that the golfer's head will stay behind the ball during the downswing.

The golf training aid has been found effective for teaching golfers to hit the ball straight consistently, by preventing the golfer from seeing the ball when the head is lifted or rotated forward or backward along the target line.

To use the golf version of the training aid, the film elements should be placed on the inside faces of the lenses of the glasses, with the edge of each film element against the nose side edge of the lens to which it is attached. The golfer should not try complete swings at first. Rather, he or she should start with very slow, very short, back swings, returning the club head to the hitting position each time. This exercise should be repeated until it can be carried out consistently without losing sight of the ball even for an instant.

The length of the back swing should then be gradually increased until the maximum backswing is reached that can be achieved without losing sight of the ball. This will become increasingly difficult for a golfer who is not very flexible in the back, neck or shoulders. However, a shorter maximum backswing will be more than compensated for by improvement in the golfer's ability to hit shots squarely with the center of the clubface.

When the golfer is confident about his or her ability to make the backswing without losing sight of the ball, slow, easy full swings can commence. This motion should be repeated until the golfer becomes accustomed to the view and feel of having the head behind the ball at impact.

Training should be continued by wearing eyeglasses with the vision restricting films on a golf course. At first, the golfer may find that by restricting the swing somewhat in order to stay behind the ball, some shots may be missed, and the ball may not travel as far as desired. These weak or missed shots will be overcome with time. Distance and consistency will improve greatly as more shots are hit squarely with the middle of the club face, and much less effort will be required to achieve a given distance.

Practicing for only ten minutes a day for one month will give most golfers confidence about their ability to hit the ball straight every time.

Various modifications can be made to the training aids described above. For example, although the peelable films are preferably provided along with a pair of glasses which they match, the films can be provided in various shapes on a single sheet, allowing the player to select films that most closely conform to the shape of the lenses of the player's previously acquired eyewear. In the case of the films designed for golfers, the opening 52, although preferably lenticular in shape as shown in FIG. 4, can be formed in other shapes. However, in each case, the borders of the opening should diverge from each other starting at a lowermost part of the opening spaced from the bottom edge of the film.

Other modifications may be made to the apparatus and method described-above without departing from the scope of the invention as defined in the following claims.

We claim:

1. A training aid comprising:

an eyeglass frame having a pair of transparent lenses, each lens having an upper and lower region; and an opaque layer of film adhering to each of said transparent lenses, the opaque layer of film on at least one of said lenses covering at least part of the lower region thereof while leaving the upper region thereof uncovered and transparent;

in which each said lens has a lower edge, in which each of said film layers has a width extending from a rightmost part thereof to a leftmost part thereof, and a lower edge extending across substantially the entire width of the film layer, the lower edge of each film layer conforming in shape to, and coinciding with, the lower edge of the lens to which it adheres; and in which each of said film layers has an upper edge extending across substantially the entire width thereof, said upper edge being convex upwardly, whereby the film layers obscure a vertically higher portion of the central part of the visual field than of the left and right portions of the visual field.

2. A training aid according to claim 1, in which said opaque layers are peelable from said lenses.

3. A training aid according to claim 1, in which said opaque layers adhere to said lenses by electrostatic attraction.

4. A training aid according to claim 1, in which the opaque layer of film on said at least one of said lenses covers substantially the entire width of the lower region, and right and left portions of the upper region thereof.

5. A training aid comprising:
   an eyeglass frame having a pair of transparent lenses, each lens having an upper and lower region, the lower region of each lens being defined in part by a lower edge of the lens; and
   a sheet having a backing layer and a plurality of pairs of opaque layers of film supported thereon and peelable therefrom;
   in which the opaque film layers of each pair have a width extending from a rightmost part thereof to a leftmost part thereof, and a lower edge extending across substantially the entire width of the film layer, the lower edges of the opaque layers of film of each said pair conforming in shape respectively to the lower edges of said transparent lenses;
   in which each of said opaque film layers has an upper edge extending across substantially the entire width thereof, said upper edge being convex upwardly, and
   in which the height of each of the opaque film layers of one of said pairs on said sheet is greater than the height of each of the opaque film layers of another of said pairs on said sheet.

6. A training aid according to claim 5, in which the width of each of the opaque film layers of one of said pairs on said sheet is greater than the width of each of the opaque film layers of another of said pairs on said sheet.

7. A training aid according to claim 5, in which the height and width of each of the opaque film layers of one of said pairs on said sheet are greater respectively than the height and width of each of the opaque film layers of another of said pairs on said sheet.

* * * * *